United States Patent [19]

Happ et al.

[11] Patent Number: 5,788,252
[45] Date of Patent: Aug. 4, 1998

[54] ERGONOMIC HANDLE FOR ROLLING MANUALLY PROPELLED VEHICLE

[75] Inventors: Kenneth C. Happ, Burlington; David D. Curry, Kenosha; Nancy C. Rittmann Gasperi, Racine; Michael D. Schoenbeck, Silver Lake; Gary S. Wollert; James R. Piehl, both of Kenosha, all of Wis.

[73] Assignee: Snap-on Technologies, Inc., Lincolnshire, Ill.

[21] Appl. No.: 589,926

[22] Filed: Jan. 23, 1996

[51] Int. Cl.⁶ .................................................. B62B 3/00
[52] U.S. Cl. ................. 280/47.34; 16/111 R; 16/DIG. 5
[58] Field of Search .................. 16/111 R, 111 A, 16/DIG. 5; 280/47.34, 18, 87.021, 87.041; 312/249.8, 351.11; 56/DIG. 18; D12/11; 15/361, 410; 37/244, 434

[56] References Cited

U.S. PATENT DOCUMENTS

| | | |
|---|---|---|
| D. 219,906 | 2/1971 | Lambertz . |
| D. 246,950 | 1/1978 | Palm, Jr. . |
| D. 267,926 | 2/1983 | Pittenger . |
| D. 356,485 | 3/1995 | Off . |
| 1,484,495 | 2/1924 | Hatherley . |
| 2,339,646 | 1/1944 | Mann ........................ 16/125 |
| 2,420,277 | 5/1947 | Wulstein . |
| 2,508,567 | 5/1950 | Dymeck . |
| 3,816,873 | 6/1974 | Thorud et al. ............. 16/111 A |
| 3,909,034 | 9/1975 | Trubiano .................. 280/47.34 |
| 3,935,787 | 2/1976 | Fisher ...................... 16/110 R |
| 4,071,920 | 2/1978 | Block ........................ 15/49 C |
| 4,531,729 | 7/1985 | Wrinkle . |
| 4,867,444 | 9/1989 | Castillo . |
| 4,908,968 | 3/1990 | Thorud et al. ................ 37/244 |
| 4,926,521 | 5/1990 | Gagnepain . |
| 5,046,387 | 9/1991 | Lavake . |
| 5,125,130 | 6/1992 | Stanish . |
| 5,312,314 | 5/1994 | Stephan et al. . |
| 5,324,094 | 6/1994 | Kain . |
| 5,475,896 | 12/1995 | Wang ....................... 16/111 R |

FOREIGN PATENT DOCUMENTS

| | | | |
|---|---|---|---|
| 3436990 | 4/1986 | Germany | 16/111 R |
| 4330434 | 3/1994 | Germany | 312/249.8 |
| 432631 | 7/1935 | United Kingdom . | |
| 1341818 | 3/1972 | United Kingdom . | |

OTHER PUBLICATIONS

Snap–on Incorporated 1995 Catalog, pp. 21 and 25.
Page from 1996 Craftsman Catalog.

*Primary Examiner*—Randolph A. Reese
*Assistant Examiner*—Donald M. Gurley
*Attorney, Agent, or Firm*—Emrich & Dithmar

[57] ABSTRACT

A wheeled, manually propelled vehicle with vertical support structure has an ergonomic handle attached to the support structure, the handle having a central section extending substantially horizontally in use and inclined sections which incline downwardly from the opposite ends of the central section and respectively terminate in curved end sections which curve toward the support structure and are integral for attachment plates for attachment to the support structure. The inclined sections facilitate grasping of the handle with an ergonomic arm position when a user is pushing the vehicle and facilitate maneuvering the vehicle around corners.

16 Claims, 1 Drawing Sheet

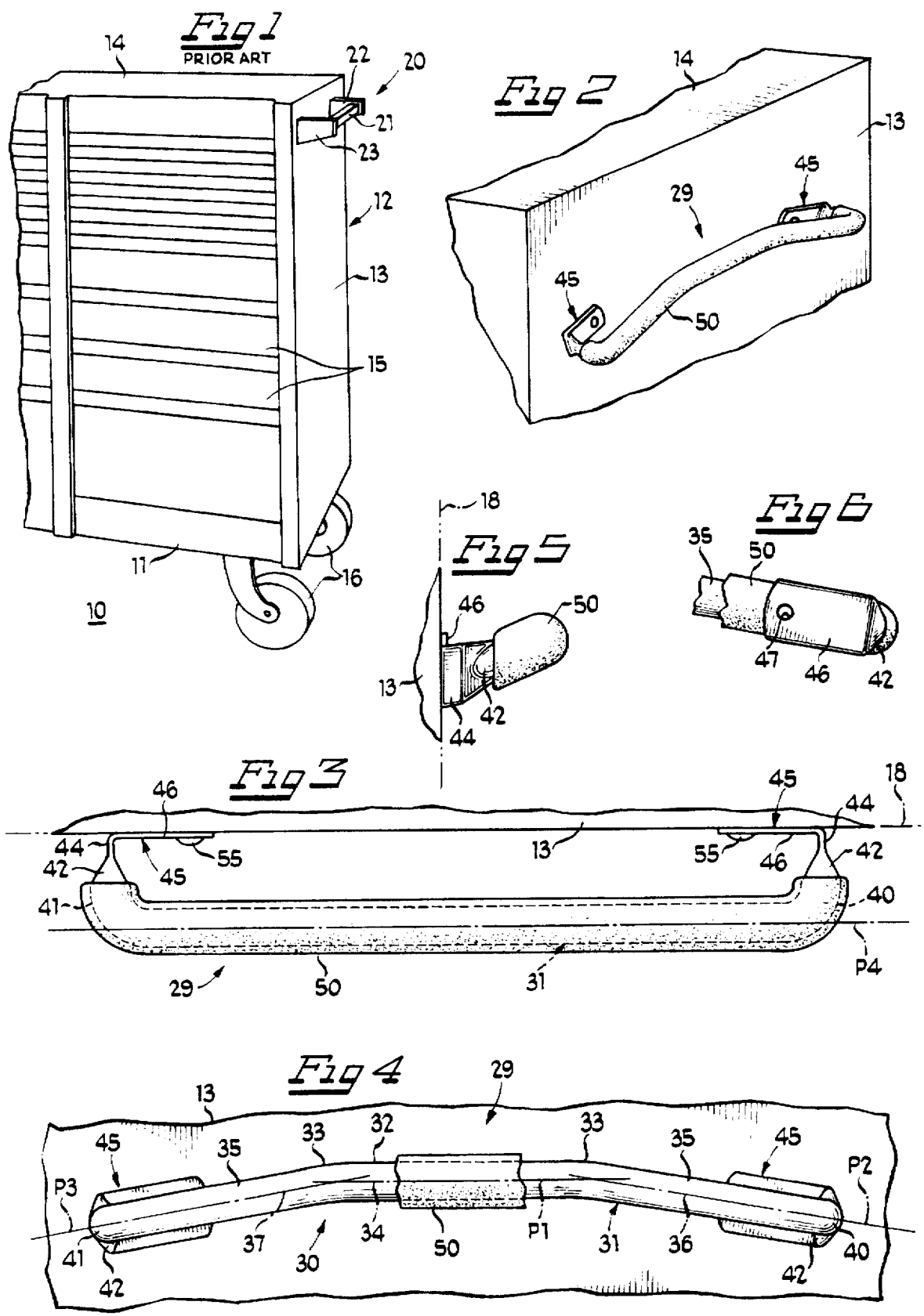

ERGONOMIC HANDLE FOR ROLLING MANUALLY PROPELLED VEHICLE

BACKGROUND OF THE INVENTION.

1. Field of the Invention

The present invention relates to rolling, manually propelled vehicles, such as wheeled cabinets, carts and the like and, in particular, to handle constructions therefor.

2. Description of the Prior Art

Various types of wheeled cabinets, carts and the like are well-known in the art. One such type of rolling vehicle is a wheeled tool chest or cabinet of the type used by automotive mechanics and service technicians and the like. Such vehicles are typically provided with one or more handles to be grasped by the user for the purpose of moving the vehicle along the floor or ground or other underlying support surface by either pushing or maneuvering the vehicle. Certain types of such vehicles, such as tool cabinets or chests, for example, can be quite heavy and can require substantial effort in order to overcome the vehicle's inertia.

Referring to FIG. 1, there is illustrated such a prior art vehicle 10 in the nature of a tool cabinet. The vehicle 10 has a base 11 carrying an upstanding support structure 12 including a pair of opposed vertical, rectangular walls 13, a rectangular rear wall (not shown) and a top wall 14. The front of the support structure 12 is open and includes a plurality of drawers 15, but it will be appreciated that the support structure 12 could have other configurations, including top-opening arrangements. The base 11 is provided with a plurality of rollers or wheels 16. At least one of the end walls 13 defines a vertical attachment plane 18 (see FIGS. 3 and 5), to which is attached a handle 20.

The handle 20 has an elongated main body 21 substantially parallel to the vehicle wall 13 and a pair of ends 22 and 23 extending generally perpendicular to the main body 21 for attachment to the vehicle wall 13. The length of the handle 20 is limited by the width of the end wall 13 so that, in the case of a typical tool cabinet, the length of the main body 21 of the handle 20 is typically less than the width of the end wall 13 and is disposed horizontally in use.

Also, when the handle end of the vehicle 10 is to be moved laterally, such as to maneuver or swing the handle end around a corner in a direction generally parallel to the direction of the handle length, there is a tendency for the user's hands to slip on the handle 20. The handle 20 is not conducive to grasping at the ends 22 and 23, since these ends are relatively short, affording only enough clearance for the user's fingers to fit between the handle 20 and the vehicle wall, and form a substantially 90° angle with the main body 21 of the handle 20.

SUMMARY OF THE INVENTION

It is a general object of the invention to provide an improved handle construction which avoids the disadvantages of prior constructions while affording additional structural and operating advantages.

An important feature of the invention is the provision of a handle construction of the type set forth which is ergonomically designed to minimize strain and discomfort in the user's hands and wrists.

A still further feature of invention is the provision of a handle construction of the type set forth, which is of simple and economical construction.

A still further feature of the invention is the provision of a wheeled vehicle incorporating a handle of the type set forth.

These and other features of the invention are attained by providing an ergonomic handle construction for a rolling, manually propelled vehicle having an upstanding support structure, the handle construction comprising: an elongated body, the body having an elongated central section extending parallel to a first plane and having opposite end portions, two inclined sections respectively integral with the end portions of the central section and respectively extending parallel to second and third planes which intersect each other and the first plane, and two end sections respectively integral with the inclined sections and spaced from the central section and extending parallel to the first plane; and attachment structure coupled to the end sections for mounting the body on the associated vehicle support structure.

Further features are attained by providing a manually propelled vehicle comprising: a base; rollers carried by the base for rolling engagement with an underlying support surface; upstanding support structure on the base defining an attachment plane; and an ergonomic handle construction mounted on the support structure at the attachment plane, the handle construction having an elongated central section extending parallel to a first plane which is perpendicular to the attachment plane and having opposed end portions, two inclined sections respectively integral with the end portions of the central section and respectively extending parallel to second and third planes which intersect each other and the first plane and the attachment plane; and attachment structure coupled to the inclined sections and attached to the support structure at spaced-apart locations along the attachment plane.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a fragmentary front perspective view of a wheeled, manually propelled vehicle incorporating a prior art handle;

FIG. 2 is an enlarged, fragmentary perspective view of a portion of the vehicle of FIG. 1, incorporating a handle in accordance with the present invention;

FIG. 3 is a further enlarged fragmentary view of the vehicle of FIG. 2, illustrating the handle in top plan;

FIG. 4 is a fragmentary view of the vehicle of FIG. 3 illustrating the handle in front elevation;

FIG. 5 is a fragmentary view of the vehicle of FIG. 3, illustrating the handle in end elevational, as viewed from the left-hand end of FIG. 3; and FIG. 6 is a fragmentary rear elevational view of the left-hand end of the handle of FIG. 4.

DESCRIPTION OF THE PREFERRED EMBODIMENT

Referring to FIGS. 2–6, there is illustrated a handle assembly 29, constructed in accordance with the present invention, which can be substituted for the handle 20 on the vehicle 10 or other manually propelled wheel vehicles. The handle assembly 29 includes a handle 30 (FIG. 4) of unitary, one-piece construction and a sleeve or sheath 50. The handle 30 includes an elongated body 31, which is preferably circular in transverse cross section. The body 31, which may be formed of metal, plastic or any other material having suitable strength and rigidity, includes an elongated, straight, central section 32 having opposite end portions 33 and a longitudinal axis 34 which extends in use parallel to a first plane P1, which is disposed perpendicular to the page in FIG. 4. Respectively unitary with the end portions 33 of the central section 32 are straight, elongated, inclined sections 35, each having a length approximately the same as the length of the central section 32, and respectively having longitudinal axes 36 and 37, which respectively extend parallel to planes P2 and P3 disposed perpendicular to the page in FIG. 4. It can be seen that the planes P2 and P3 intersect each other and the plane P1, each of the planes P2 and P3 being inclined downwardly at an angle A of less than 45° with respect to the plane P1 and, in the illustrated preferred embodiment, being inclined at an angle of approximately 10° with respect to the plane P1. Preferably, the longitudinal axes 34, 36 and 37 of the sections 32 and 35 all lie in a common plane P4, which extends parallel to the cabinet attachment plane 18, i.e., perpendicular to the page in FIG. 3.

The distal ends of the inclined sections 35 are, respectively, unitary with curved end sections 40 and 41, which respectively have tapered, flattened ends 42 which extend substantially perpendicular to the common plane P4 and parallel to the plane P1. The end sections 40 and 41, are respectively, unitary with attachment brackets 45, each of which is in the form of a flat, right-angle bracket having a short leg 34 unitary with the associated tapered end 42 and an elongated main plate 46 having a hole 47 formed therethrough. Preferably, the main plates 46 are substantially coplanar and extend toward each other substantially parallel to the plane P4 and have longitudinal axes which are, respectively, substantially coplanar with the longitudinal axes 36 and 37 of the inclined sections 35.

The sleeve or sheath 50 is an elongated, tubular member which is fitted over the body 31 and covers it along substantially its entire length. Preferably, the sleeve 50 is formed of a suitable flexible and resilient material, so as to provide cushioning and an improved frictional gripping surface for the user's hands.

Referring now in particular to FIGS. 2–5, in use, the handle 30 is attached to one of the end walls 13 of the vehicle 10 at the attachment plane 18. Preferably, the handle 30 is arranged so that the plane P1 of the central section 32 is horizontal in use and perpendicular to the attachment plane 18. More particularly, the main plates 46 of the attachment brackets 45 are placed flush against the associated vehicle end wall 13 and fixedly secured thereto, as by suitable screws 55. Preferably, the handle 30 is oriented so that, when thus attached in use, the inclined sections 35 will incline downwardly from the central section 32, as illustrated in FIGS. 2 and 4.

It will be understood that when the handle 30 is mounted in place on the vehicle 10, it affords an improved ergonomic operation. Thus, for pushing the vehicle 10, the user's hands can, respectively, grip the inclined sections 35. The downward inclination of the sections 35 minimizes the flexing or twist of the user's wrists and forearms, significantly reducing strain on the user. Also, when the user's hand grips one of the inclined sections 35 for maneuvering the vehicle 10 around a corner, the downward inclination of the inclined section 35 affords an improved grip, so that a significant portion of the force exerted by the user is applied in a direction inclined to the longitudinal axis of the inclined section 35, thereby reducing the tendency of the user's hand to slip along the handle 30. It will, of course, be appreciated that the sleeve or sheath 50 provides an improved grip which will also tend to inhibit slippage of the user's hand while, at the same time, cushioning the user's grip.

While, in the illustrated embodiment, the vehicle 10 is in the nature of a tool cabinet, it will be appreciated that the present invention has application to other types of manually propelled, wheeled vehicles, such as open carts or the like.

From the foregoing, it can be seen that there has been provided an improved handle for a manually propelled, rolling vehicle, which has an ergonomic design which substantially reduces stress in a user's hands, wrists and arms.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. An ergonomic handle construction for a rolling, manually propelled vehicle having an upstanding support structure, said handle construction comprising: an elongated body, said body including an elongated central section having opposite end portions, two non-parallel inclined sections respectively integral with said end portions of said central section, said central section and said inclined sections being parallel to a common plane, and two end sections respectively integral with said inclined sections and spaced from said central section and extending perpendicular to said plane; and attachment structure including a pair of substantially flat, elongated attachment plates respectively coupled to said end sections and respectively having longitudinal axes substantially parallel to said plane for mounting said body on the associated vehicle support structure.

2. The handle construction of claim 1, wherein each of said central and inclined sections is straight.

3. The handle construction of claim 2, wherein each of said central and inclined sections is of substantially the same length.

4. The handle construction of claim 1, wherein each of said end sections is curved.

5. The handle construction of claim 1, wherein said handle construction is unitary.

6. The handle construction of claim 1, and further comprising a gripping sheath covering at least a portion of said body.

7. An ergonomic handle construction for a rolling, manually propelled vehicle having an upstanding support structure, said handle construction comprising: an elongated body, said body including an elongated central section having a first longitudinal axis and having opposed end portions, two non-parallel inclined sections respectively integral with said end portions of said central section and respectively having second and third longitudinal axes which intersect said first axis and cooperate therewith to define a common plane, and two end sections respectively integral with said inclined sections and spaced from said central section and respectively extending from said inclined sections substantially perpendicular to said plane, each end section having a length substantially less than that of any of said central and inclined sections; and attachment structure coupled to said end sections for mounting said body on the associated vehicle support structure.

8. The handle construction of claim 7, wherein said body is symmetrical about a plane perpendicular to said common plane and bisecting said central section.

9. The handle construction of claim 7, wherein each of said second and third axes is inclined with respect to said first axis at a predetermined acute angle less than 45°.

10. The handle construction of claim 9, wherein said predetermined angle is approximately 10°.

11. The handle construction of claim 7, wherein each of said inclined sections inclines downwardly in use from said central section.

12. A manually propelled vehicle comprising: a base; rollers carried by said base for rolling engagement with an underlying support surface; upstanding support structure on said base defining a planar attachment surface; and an ergonomic handle construction mounted on said support structure at said attachment surface, said handle construction including an elongated central section having opposed end portions, two non-parallel inclined sections respectively integral with the end portions of said central section, each of said sections being substantially parallel to the attachment surface, and two end sections respectively integral with said inclined sections and spaced from said central section and respectively extending from said inclined sections substantially perpendicular to said attachment surface, each end section having a length substantially less than that of any of said central and inclined sections; and attachment structure coupled to said end sections and attached to said attachment surface at spaced-apart locations thereon.

13. The vehicle of claim 12, wherein said attachment plane is disposed vertically in use.

14. The vehicle of claim 12, wherein each of said inclined sections is inclined downwardly in use from said central section.

15. The vehicle of claim 12, and further comprising a gripping sheath covering at least a portion of said body.

16. A manually propelled vehicle comprising: a base; rollers carried by said base for rolling engagement with an underlying support surface; upstanding support structure on said base defining a planar attachment surface; and an ergonomic handle construction mounted on said attachment surface, said handle construction including an elongated central section having opposed end portions, two non-parallel inclined sections respectively integral with the end portions of said central section, said central section and said inclined sections being parallel to said attachment surface, and two end sections respectively integral with said inclined sections and spaced from said central section and extending perpendicular to said attachment surface; and attachment structure including a pair of substantially flats elongated attachment plates respectively coupled to said end sections and respectively having longitudinal axes substantially parallel to said attachment surface and attached to said attachment surface at spaced-apart locations thereon.

\* \* \* \* \*